Patented Aug. 24, 1954

2,687,422

UNITED STATES PATENT OFFICE 2,687,422

P-ACYLOXYSTYRENES AND INTERMEDIATES THEREFOR

Charles G. Overberger, Brooklyn, N. Y., assignor to L. A. Dreyfus Company, Oak Tree, N. J., a company of New York No Drawing. Application December 13, 1949, Serial No. 132,803

3 Claims. (Cl. 260—410.5)

1

This invention relates to p-acyloxystyrenes having unique properties, to intermediates for making such p-acyloxystyrenes, and to methods of making the styrenes, and the intermediates, and their utilization.

In the prior art, p-acetoxystyrene has been produced by dehydroacetylation of the diacetate of p-hydroxyphenyl methyl carbinol and the compound has also been prepared by the dehydration of p-(α-hydroxyethyl)-phenyl acetate. Higher acyl derivatives have not been described in the literature nor have their properties been disclosed. The methods which have been used are not so desirable for industrial use due to relatively low yields and presence of impurities that affect the utilization of such materials particularly in the production of polymers and copolymers.

Among the objects of the present invention is the production of p-acyloxystyrenes and intermediates therefor giving substantial yields of high grade products.

Other objects include the production of such products exhibiting unique properties.

Still further objects include methods of making such products and intermediates.

Yet further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention, p-acyloxystyrenes are produced by decarboxylation of p-acyloxycinnamic acids since it has been found that such cinnamic acid derivatives may be heat treated to remove the carboxyl group leaving the remainder of the molecule intact, the p-acyloxystyrenes being produced in substantial yields. The p-acyloxycinnamic acids are readily produced in substantial yield by acylation of p-hydroxycinnamic acid. The acyl group in the compounds referred to above is desirably a fatty acid group having at least three carbon atoms, which acyl group is desirably introduced into the desired derivatives by the use of the corresponding acid halide such as chloride or bromide, or acid anhydride. The acylation may also be carried out by ester interchange with an ester of acetic acid catalyzed by acid. It may also be carried out by treating the appropriate acid chloride with the sodium salt of p-hydroxy cinnamic acid. Any acylation step may be used in combination with any desired decarboxylation step. The present invention therefore utilizes a combination of steps in which p-hydroxycinnamic acid is converted into an acyloxycinnamic acid which is then decarboxylated to the corresponding p-acyloxystyrene.

The p-hydroxycinnamic acid may be obtained from any desired source. The symmetrical trans form is generally obtained in reactions and is preferably used to the cisisomer. One method of making it involves heating benzaldehyde, acetic anhydride and sodium acetate to produce condensation whereby p-hydroxycinnamic acid (coumaric acid) is obtained. A very satisfactory procedure involves reaction of p-hydroxy or p-alkoxy benzaldehyde with malonic acid using a solvent such as pyridin and a catalyst such as aniline, piperidine, or a tertiary amine. Other solvents such as alcohol and other amines, primary and secondary, and ammonia may be used. As an example the following is given:

123 g. (1 mole) of p-hydroxybenzaldehyde and 1.04 g. (1 mole) of malonic acid were dissolved in 158.5 (2 moles) of pyridine with aniline as catalyst and the reaction carried out by heating to a temperature of about 60–100° for 3–8 hours. The product was recrystallized. However p-hydroxycinnamic acid from any source may be used.

The acylation may be carried out using any of the methods set forth above. The fatty acid chloride will be used illustratively. As exemplary of such acid halides any fatty acid may be used having from 3 to 18 carbon atoms and higher. As exemplary of such acid halides there may be mentioned propionyl chloride, lauric acid chloride, palmitic acid chloride, stearic acid chloride, etc., so that saturated fatty acid halides are preferred. Various methods of acylation may be employed. A satisfactory procedure is as follows: the appropriate acid chloride is added slowly to a cooled solution (5° C. but it may be from —10° to 20° C.) of p-hydroxycinnamic acid in a solvent such as dry pyridine, and desirably agitated for example for 4 hours at room temperature. The desired product is obtained by acidifying the reaction mixture with dilute acid such as sulphuric acid, desirably cooled, i. e. containing ice, whereupon the desired product is precipitated.

In lieu of pyridine, other acid retaining agents may be employed including alkalis, ammonia, amines, etc. Non-aqueous reaction media are preferably utilized although the reaction may be carried out in aqueous media with alkalis for example, but maximum yields are obtained in an indifferent solvent under anhydrous conditions. In lieu of pyridine, quinoline, other tertiary amines may be used, such as α-picoline, γ-picoline, 2,6 butadiene, 2,4 butadiene, 2,4,6 collidine, and other alkyl pyridines; 2-methylquinoline and 4-methylquinoline and other alkyl quinolines. Enough base should be used to adequately remove the acid formed in the reaction. However, additional base is not harmful and is often employed. The temperatures used may be varied, particularly dependent on the acyl chlorides, etc., used. In later stages of reaction, the mixture may be heated to moderate temperatures to complete reaction if necessary.

The p-acyloxycinnamic acids separate as semi-solids or oils and may be purified by recrystallization as for example from binary mixtures of solvents such as alcohol-water mixtures. Petroleum ether (hexane) and benzene may be used, but offer no advantage.

A general consideration of the properties of these p-acyloxycinnamic acids is desirable. Some of them such as p-caproxy and p-capryloxy cinnamic acids do not form crystals easily. Increasing the length of the ester group seems to decrease the tendency toward crystallinity. While the p-acetoxy-cinnamic acid melts at 206° C. to a clear liquid, the higher derivatives show anomalous behavior. For example, p-butyroxy, p-caproxy, and p-capryloxycinnamic acids contract between 10 to 20° below the melting point and show anomalies on melting due to the formation of liquid crystals. Such compounds preserve a pseudocrystalline structure above the melting point which is stable as a cloudy melt between this temperature and that at which a clear isotropic liquid is formed. Liquid crystal formation is most likely to be found in substances of this character consisting of molecules of unsymmetrical shape, and particularly in substances in which very long molecules occur.

The two liquid phases, the crystalline liquid and the amorphous liquid, differ in the degree of orientation of their molecular groupings. The former phase may be regarded as intermediate between a crystalline solid and a liquid since its individual particles are more restricted in their movement than those of the liquid and less than those of the solid. This situation is clarified by a consideration of the crystal lattice of a long chain aliphatic compound, in which the lattice units are movable not only within a given equilibrium area, as in a crystal solid, but also are able to rotate freely about a given axis without disturbing the crystalline state by moving the lattice linkages.

The transition of such compounds from the solid to liquid state takes place in two or more stages. The smectic and nematic phases represent two of a number of geometrically possible intermediate phases. In the smectic state the lateral attractions between molecules are not broken down. They are arranged with their axes parallel and are restricted in their movement to motion in a series of equispaced parallel sheets, within each of which, however, there is no planarity of arrangement and the molecules are free to move at random.

In addition to the asymmetry of a molecule, the simultaneous existence of strong dipoles and easily polarized groups appears to be essential. A liquid crystal may be considered a structure of molecular aggregates resulting from the attraction of a dipole of one molecule for the readily polarizable parts of another molecule which in turn attracts a third molecule and so on until a bundle-like structure is formed.

The formation of liquid crystals by the p-butyroxy, p-caproxy and p-capryloxycinnamic acids is in accordance with the above views. The molecules are asymmetrical and rectilinear, with a small degree of internal free rotation. The acyloxy group furnishes the necessary dipole attraction. p-Acetoxycinnamic acid forms but one liquid phase; the non-occurrence of a second phase is probably due to the absence of the methylenic group.

There is tabulated below in Table I exemplary p-acyloxy-cinnamic acids and some of their properties:

TABLE I.—P-ACYLOXYCINNAMIC ACIDS

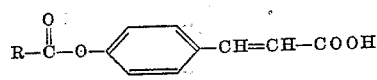

| R | Yield,[1] Percent | Recryst. Solvent | M. P.[3] | Percent Carbon | | Percent Hydrogen | | Neut. equiv. | |
|---|---|---|---|---|---|---|---|---|---|
| | | | | Calcd. | Found | Calcd. | Found | Calcd. | Found |
| CH$_3$ | 38 | Water | 205.5–206 | 64.07 | 64.15 | 4.89 | 5.09 | 206 | 205.7 |
| C$_2$H$_5$ | 70 | Alcohol-Water | 181–183 | 65.44 | 65.21 | 5.50 | 5.76 | 220 | 220 |
| C$_3$H$_7$ | 64 | ⸺do⸺ | 163–164 / 185–186 | 66.65 | 66.91 | 6.03 | 5.24 | 234 | 232 |
| C$_5$H$_{11}$ | 85 | ⸺do⸺ | 149.7–150.7 / 175.6–177.6 | 68.68 | 68.72 | 6.92 | 6.95 | 262 | 260 |
| C$_7$H$_{15}$ | 78 | ⸺do⸺ | 149–153 / 177–181 | 70.32 | 70.42 | 7.64 | 7.68 | 290 | 289 |
| C$_{11}$H$_{23}$ | [2] 88 | 1:1 Benzene-Methanol | 159–160 / 164–167 | 72.84 | 72.45 | 8.73 | 8.86 | 346 | 346 |
| C$_{15}$H$_{31}$ | [2] 90 | 3:1 Benzene-Methanol | 160–161 / 165–167 | 74.40 | 74.71 | 9.49 | 9.54 | 402 | 402 |

[1] Yield of purified product.
[2] Yield after one recrystallization.
[3] All melting points are corrected. The first melting point indicates the formation of the cloudy melt (liquid crystal); the second, the formation of clear liquid.

The following examples illustrate the production of these p-acyloxycinnamic acids, using the particular reaction conditions set forth hereinabove, namely reaction of acid chloride with p-hydroxy cinnamic acid in a cooled solution (5° C.) in pyridine as solvent, the time of reaction and temperature, and recovery being as there set forth.

I.—p-Butyroxy cinnamic acid 0.3 mole of n-butyryl chloride were reacted with 0.155 mole of p-hydroxy cinnamic acid in 2.22 moles of dry pyridine under conditions set forth above. A white amorphous precipitate was obtained upon addition to dilute sulphuric acid (1.153 sp. gr.). After one recrystallization from alcohol and water a 64% yield of p-butyroxy cinnamic acid was obtained having a M. P. 163–164°, 185–186° (see Table I).

Recrystallization of the product from alcohol yielded a small amount of white crystalline material, which on analysis was indicated to be the byproduct of the esterification of p-butyroxy cinnamic acid by p-hydroxy cinnamic acid.

Analysis (calculated for $C_{22}H_{20}O_6$): C, 69.46; H, 5.30. Found: C, 69.45; H, 5.29.

II.—p-Caproxy cinnamic acid 0.3 mole of caproyl chloride was reacted with 0.155 mole of p-hydroxycinnamic acid in dry pyridine solution (2.22 moles) as set forth above. Addition to dilute sulphuric acid (1.153 sp. gr.), gave a yellow oil which formed an amorphous solid within one hour. Recrystallization from alcohol and water with charcoal gave an 85% yield of white crystalline solid having the characteristics set forth in Table I.

Recrystallization of the product from alcohol yielded a small amount of white crystalline material, which on analysis was indicated to be the byproduct of the esterification of p-caproxy cinnamic acid by p-hydroxy cinnamic acid.

Analysis calculated for $C_{24}H_{24}O_6$: C, 70.57; H, 5.92. Found: C, 70.54; H, 5.85.

III.—p-Capryloxy cinnamic acid 0.155 mole of p-hydroxy cinnamic acid was reacted with 0.3 mole of capryl chloride in dry pyridine (2.22 moles) as set forth above. Addition to dilute sulphuric acid (1.153 sp. gr.) gave a yellow oil which changed to an amorphous solid within one hour. The data after recrystallization from alcohol and water with charcoal is given in Table I.

IV.—p-Propionoxy cinnamic acid 0.22 mole of p-hydroxy cinnamic acid was reacted with 0.443 mole of propionic acid chloride in 2.35 mole of redistilled pyridine. The data after recrystallization twice from 90% ethanol, is given in Table I.

V.—p-Lauroxy cinnamic acid (p-dodecoyl cinnamic acid)

0.22 mole of p-hydroxycinnamic acid was reacted with 0.44 mole of lauric acid chloride in 2.35 mole of redistilled pyridine. The data after recrystallization four times from a 1:1 benzene-methanol mixture is given in Table I but it may be added that the compound was found to sinter at 135° C. prior to forming the turbid liquid at 159–160° C.

VI.—p-Palmitoxy cinnamic acid (p-hexadecoyloxy cinnamic acid)

0.3 mole of p-hydroxycinnamic acid and 0.6 mole of palmitic acid chloride were reacted in 3.3 mole of redistilled pyridine under conditions as set forth above. The data on the compound after recrystallization from a 3:1 benzene-methanol mixture, is given in Table I but it may be noted that the compound was found to sinter at 139° C.

In these various examples, the proportions may vary but to avoid by-products as far as possible, the mole ratios as given are best employed.

As noted, the p-acyloxycinnamic acids beginning with the butyroxy derivative show the property of forming liquid crystals on melting and the length of alkyl or analogous substituent group may be selected to give this property. While several by-products produced by esterification of a p-acyloxycinnamic acid with p-hydroxycinnamic acid have been noted, any of the entire series of such esters may be produced including those formed with any of the particular p-acyloxycinnamic acid as set forth below. Such by-products may be obtained, as for example, in the production of p-butyroxy and p-caproxy cinnamic acids, by slowly cooling the solution of acids in alcohol. Analyses of these high melting by-products indicate their structure, as in the case of the specific by-products mentioned, to be

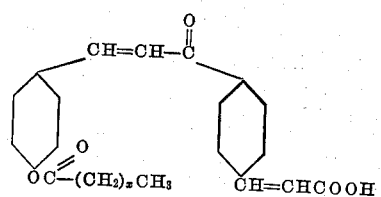

$x=4$ and $6$

The utility of the p-acyloxycinnamic acids lies in their decarboxylation to form corresponding p-acyloxystyrenes that are of particular value for the production of polymers both homopolymers and copolymers. So that monomeric p-acyloxystyrenes are valuable products and may be readily produced in accordance with the present invention. Decarboxylation may be carried out in a variety of ways to produce substantial yields of the desired product. The desired p-acyloxy cinnamic acid may be heated to decarboxylating temperature desirably in the presence of a polymerization inhibitor, and desirably in the presence of a solvent. Any of the p-acyloxycinnamic acid derivatives referred to above may be subjected to decarboxylation to split off $CO_2$ and convert the corresponding —CH=CH—COOH group to —CH=CH$_2$.

While decarboxylation may be carried out by distillation alone, or by dry distillation of the sodium salt of the acid with soda lime, the more desirable methods include decarboxylation by heat in the presence of quinoline and copper powder desirably with an added polymerization inhibitor. Decarboxylation may be carried out in some instances at least in the absence of the copper, the quinoline itself acting as a catalyst, or decarboxylation with copper alone. Decarboxylating inducing metals other than copper may be employed, such as zinc or iron; or decarboxylation may also be effected by the use of mineral or organic acids.

Any desired polymerization inhibitor for the styrene derivative may be employed such as p-tert. butyl catechol, picric acid, hydroquinone, m-phenylene diamine, nitrobenzene, phenol, sulphur, phenyl-B-naphthylamine, trinitrobenzene, resorcinol, etc. It may be noted that the copper itself acts to inhibit polymerization but other added inhibitors may be used. The picric acid if used, imparts a yellow color to the distilled product but does not change its refractive index. In some cases, as in p-capryloxystyrene, some solid distillate may be recovered also.

The decarboxylation reaction is fairly rapid and may for example, in the case of the preferred procedure, be completed in less than an hour, i. e. forty minutes. Decarboxylation usually begins around 140° C. after which the temperature may be maintained between that of active decarboxylation and the boiling point of any solvent present, such as quinoline. Active decarboxylation is evidenced between 140 and 180° C. with maximum rate in general around 205–210° C.

The following general procedure may be utilized desirably for decarboxylation.

Under an atmosphere of nitrogen, desirably, 10 parts by weight unless otherwise indicated) of the p-acyloxy cinnamic acid, 30 parts of quinoline, and a small amount of p-tert. butyl catechol were added to a distilling flask and heated by means of an oil bath. When the acid had dissolved in the quinoline, 1 part of copper powder was introduced and the temperature increased at a moderate rate until (around 140° C.) decarboxylation of the acid began. The evolving carbon dioxide may be detected by allowing the gas to bubble through lime water. At this point the temperature was increased slowly until the vapor temperature reached the boiling point of quinoline (235° C.). The period of decarboxylation was generally about 40 minutes. The purification for each styrene may be varied, but the following general procedure may be noted.

Distil the contents of the flask at reduced pressure in an atmosphere of nitrogen. The distillate is taken up in ether, washed several times with 2.4 N hydrochloric acid, followed by aqueous sodium bicarbonate washes and water washes and addition of anhydrous magnesium sulfate. To the ether extract, a small amount of p-tert. butyl catechol is added and the ether removed by distillation. The remaining liquid is distilled at reduced pressure in an atmosphere of nitrogen. A colorless liquid is obtained which is further purified, if desired, by one or more fractionations. The general procedure outlined above was followed in all the examples set forth below unless otherwise indicated. The proportions as given in the above example may be varied but are desirably employed.

VII.—p-Vinyl phenol propionate

After the period of decarboxylation was over, the reaction mixture in the flask was distilled under reduced pressure in an atmosphere of nitrogen. The distillate was taken up in ether, treated with eight washings of cold 2.4 N hydrochloric acid, followed by two washings of dilute sodium bicarbonate solution and then finally with water. The ethereal extract was dried over anhydrous magnesium sufate.

To the ether extract a small amount of p-tert. butyl catechol was added, and the ether was removed by disillation. The remaining liquid was fractionally distilled under reduced pressure; the crude yield was 50%. After five such distillations a colorless liquid was obtained. The data is given in Table II below.

VIII.—p-Vinyl phenyl laurate

After decarboxylation, the reaction mixture was distilled under reduced pressure and the distillate was dissolved in ether. The ether solution was washed thoroughly with cold 2.4 N. hydrochloric acid, dilute sodium bicarbonate solution and water. The fraction distilling between 144° and 157° C. (1 mm.) appeared to be solid at room temperature, so the purification was carried out by recrystallization from 95% methanol. After recrystallization four times, the compound decolorized bromine in carbon tetrachloride solution readily, and melted at 44–45° C. The data is given in Table II below.

The impurities, separated from the recrystallization, melted diffusively at about 95° C. Analysis showed that the composition of this material (C, 79.09; H, 10.65) was close to that of the monomeric p-vinyl phenyl laurate, but the compound did not take up bromine readily. The material was believed to be a polymer of the substituted styrene.

IX.—p-Vinyl phenyl palmitate

The reaction mixture, after decarboxylation, was separated from the copper powder by filtration. The filtrate was mixed with ether, and the ether solution was washed thoroughly with cold 2.4 N. hydrochloric acid, dilute sodium bicarbonate solution and then water. The crude yield, after the ether was removed by distillation, was 90%. It is believed that some palmitic acid might be mixed with the crude product. The crude product was recrystallized three times from 95% methanol. The compound readily decolorized bromine in carbon tetrachloride solution. The data is given in Table II.

These examples illustrate methods of decarboxylation and the table below gives data in this connection as well as with respect to other p-acyloxystyrenes.

TABLE II.—P-ACYLOXYSTYRENE $$R-\overset{O}{\underset{\|}{C}}-O-\underset{}{\bigcirc}-CH=CH_2$$

| R | B. P., ° C. (mm.) | Yield, Percent | $n_D^{25}$ | $d_4^{25}$ | Molecular Refraction Calcd. | Molecular Refraction Found | Formula | Percent Carbon Calcd. | Percent Carbon Found | Percent Hydrogen Calcd. | Percent Hydrogen Found |
|---|---|---|---|---|---|---|---|---|---|---|---|
| $CH_3$ | 80 (1.5) | 2 37 | 1.5397 | 1.0548 | 46.23 | 48.22 | $C_{10}H_{10}O_2$ | 74.05 | 73.79 | 5.98 | 5.98 |
| $C_2H_5$ | 85–86.5 (1) | 2 50 | 1.5303 | 1.0402 | 50.88 | 52.35 | $C_{11}H_{12}O_2$ | 74.99 | 74.62 | 6.87 | 6.88 |
| $n\text{-}C_3H_7$ | 95–96 (2) | 2 34 | 1.5238 | 1.0156 | 55.48 | 57.30 | $C_{12}H_{14}O_2$ | 75.76 | 76.03 | 7.42 | 7.41 |
| $n\text{-}C_5H_{11}$ | 112–113 (1.5) | 2 43 | 1.5146 | 0.9880 | 64.69 | 66.60 | $C_{14}H_{18}O_2$ | 77.03 | 76.86 | 8.31 | 8.41 |
| $n\text{-}C_7H_{15}$ | 129–130 (2.0) | 2 31 | 1.5074 | 0.9670 | 73.99 | 75.84 | $C_{16}H_{22}O_2$ | 78.01 | 77.87 | 9.00 | 9.12 |
| $n\text{-}C_{11}H_{23}$ | M. P., 44–45 [1] | 77 | | | | | $C_{20}H_{30}O_2$ | 79.42 | 79.46 | 10.00 | 9.99 |
| $n\text{-}C_{15}H_{31}$ | M. P., 59–60 | 70 | | | | | $C_{24}H_{38}O_2$ | 80.39 | 80.26 | 10.68 | 10.79 |

[1] All M. P. are corrected.
[2] Yields of refractionated product.

The styrene derivatives mentioned in this paper exhibit optical exaltation as expected, since a conjugated system is present, partly within the ring and partly within the side chain. In addition, as for any homologous series of compounds, the exaltation is constant within an experimental range of error. The increment $R_{CH_2}$, evaluated from the experimental molar refractions, varies from 4.52 to 4.62 compared to the given value, 4.6, for liquids at 20° and the D line. The calculated and experimental values for the compounds prepared and described here are listed in Table II.

The monomers produced in accordance with the present invention contain straight chain alkyl groups which when polymerized give a polymer with this alkyl group in the side chain. In particular the formation of crystallites in such a side chain and the influence of this crystallization on the polymer or copolymer properties are of special interest as for example in chewing gum base compositions.

Having thus set forth my invention, I claim:

1. The method of preparing p-acyloxystyrenes which comprises acylating p-hydroxycinnamic acid to form a p-acyloxycinnamic acid and decarboxylating the latter to form a p-acyloxystyrene, the acyl group being a fatty acid acyl of at least three carbon atoms.

2. The method of making p-acyloxystyrenes which comprises heating to de-carboxylating temperature a p-acyloxycinnamic acid in which the acyl group is fatty acid acyl of at least three carbon atoms, in the presence of a polymerization inhibitor.

3. The method of claim 2 carried out in the presence of quinoline and copper.

References Cited in the file of this patent

UNITED STATES PATENTS

| Number | Name | Date |
|---|---|---|
| 2,276,138 | Alderman et al. | Mar. 10, 1942 |
| 2,485,125 | Wilkinson | Oct. 18, 1949 |

OTHER REFERENCES

Ogawa: Bull. Chem. Soc. of Japan 2 (1927), pp. 20-6.